United States Patent [19]

Wiele

[11] Patent Number: 4,497,476
[45] Date of Patent: Feb. 5, 1985

[54] DEVICE FOR POSITIONING A PLUG FOR REPAIRING PANES OF GLASS

[75] Inventor: Robert W. Wiele, Prior Lake, Minn.

[73] Assignee: Novus Inc., Minneapolis, Minn.

[21] Appl. No.: 472,043

[22] Filed: Mar. 4, 1983

[51] Int. Cl.³ .............................................. B25B 3/00
[52] U.S. Cl. .......................................... 269/1; 269/43; 269/21
[58] Field of Search ........................ 269/21, 1, 2, 3, 37, 269/43, 904; 294/64 R; 228/49 C; 248/362, 363, 206 R, 163 R, 167, 188.1; 29/259; 428/65; 264/36; 65/28; 156/94, 391

[56] References Cited

U.S. PATENT DOCUMENTS

| | | | |
|---|---|---|---|
| 358,836 | 3/1887 | Casler | 248/167 |
| 2,558,817 | 7/1951 | Bryant | 248/363 |
| 2,665,872 | 1/1954 | De Witt | 248/362 |
| 2,844,345 | 7/1958 | Sherman | 248/166 |
| 3,964,710 | 6/1976 | Conroy | 269/21 |
| 3,986,913 | 10/1976 | Walz . | |
| 4,073,094 | 2/1978 | Walz . | |
| 4,208,229 | 6/1980 | Giardini . | |
| 4,291,866 | 9/1981 | Petersen | 269/1 |

Primary Examiner—Robert C. Watson
Attorney, Agent, or Firm—Kinney & Lange

[57] ABSTRACT

A device for supporting a circular disc to be cemented in an opening in a rigid plate-like member, such as a pane of plate glass, comprises a support frame, a first set of legs around the perimeter of said frame, and a second set of legs spaced inwardly from said first set of legs. All of said legs are terminated along the same plane spaced from the frame member. A support element has a suction cup to hold a rigid plug having a diameter less than the area circumscribed by the first legs, and greater than the area circumscribed by the second legs. A spring resiliently urges the plug against the ends of the second legs so that a surface of the plug lies in said plane. The frame is held against the pane or plate like member so that one surface of the plate member also lies in said plane and the plug can be held in the hole with one surface exactly parallel in a plane coincident with the plane of the plate.

8 Claims, 2 Drawing Figures

DEVICE FOR POSITIONING A PLUG FOR REPAIRING PANES OF GLASS

BACKGROUND OF THE INVENTION

1. Field of the Invention

This invention relates to devices for positioning a plug for filling a hole to repair a rigid sheet, such as a pane of glass.

2. Description of the Prior Art

It can be prohibitively expensive to replace entire panes of plate glass each time such a pane is cracked. Many methods have been tried to repair cracks, in order to avoid this expense. One technique involves removing a piece of glass around the crack by cutting a circular hole through the pane. A glass plug, slightly smaller in dimension than the hole, is inserted in the hole. The circular gap between the plug and the pane of glass is then filled with a bonding material such as plastic resin. This technique is generally discussed in U.S. Pat. No. 3,986,913 to Walz, issued Apr. 24, 1975.

A subsequent patent to Walz, U.S. Pat. No. 4,073,094, issued Feb. 14, 1978, discloses apparatus for cutting the hole in the pane.

In order to perform a satisfactory repair, the surface of the glass plug must be exactly in the plane of the surface of the pane of glass being repaired. Any deviation between the plane of the surface of the plug and the plane of the pane of glass results in distortion and reflections which make the repair immediately visible and esthetically unappealing. The essential characteristic required in positioning the plug in the hole before bonding is the ability to align the plug properly to avoid the negative characteristics which result from the plug lying out of the plane of the pane of glass.

One alignment tool is disclosed in U.S. Pat. No. 4,208,229 to Giardini, issued June 17, 1980. FIGS. 3 and 4 show a disk 134 which rests against the pane of glass and the plug 130. Plug 130 is mounted to disk 134 by pressure-sensitive adhesive film. The disk is then mounted over the opening in the pane of glass, so that the glass plug and the pressure-sensitive adhesive film are aligned in the opening, with the adhesive film generally in the plane of the surface of the glass pane.

SUMMARY OF THE INVENTION

A device for supporting a plug in a hole while repairing a break in a rigid plate includes a frame with a first set of legs extending away from the frame to circumscribe a first area of the frame. A second set of legs mounted on and extending away from the frame in generally the same direction as the first set of legs circumscribes a second area of the frame smaller than and within the first area.

Each leg of the first and second sets has a distal end spaced outwardly from the frame with a flat end surface, so that the end surfaces of the legs of the first and second sets are coplanar.

The device includes means for supporting a plug having a plug shape and size generally smaller than the first area. The means for supporting the plug is preferably a support element slidably mounted through the frame with a suction cup means for attaching one end of the element to a surface of the plug. Bias means are provided for urging the plug against the end surfaces of the legs of the second set. The bias means is preferably a spring which urges the support element away from the plug and to an opposite side of the frame.

The device, with the supported plug is positionable against the rigid plate with the end surfaces of the leg of the first set contacting a surface of the rigid plate outwardly of the opening so that the plug is held within the opening with the surface of the plug coplanar with the surface of the plate.

The frame preferably is a spider including a central portion and three side portions or arms extending away from the central portion generally in a common plane. Each set preferably includes three legs, with one leg of each set being mounted on each arm.

DETAILED DESCRIPTION OF THE PREFERRED EMBODIMENTS

Figure 1:
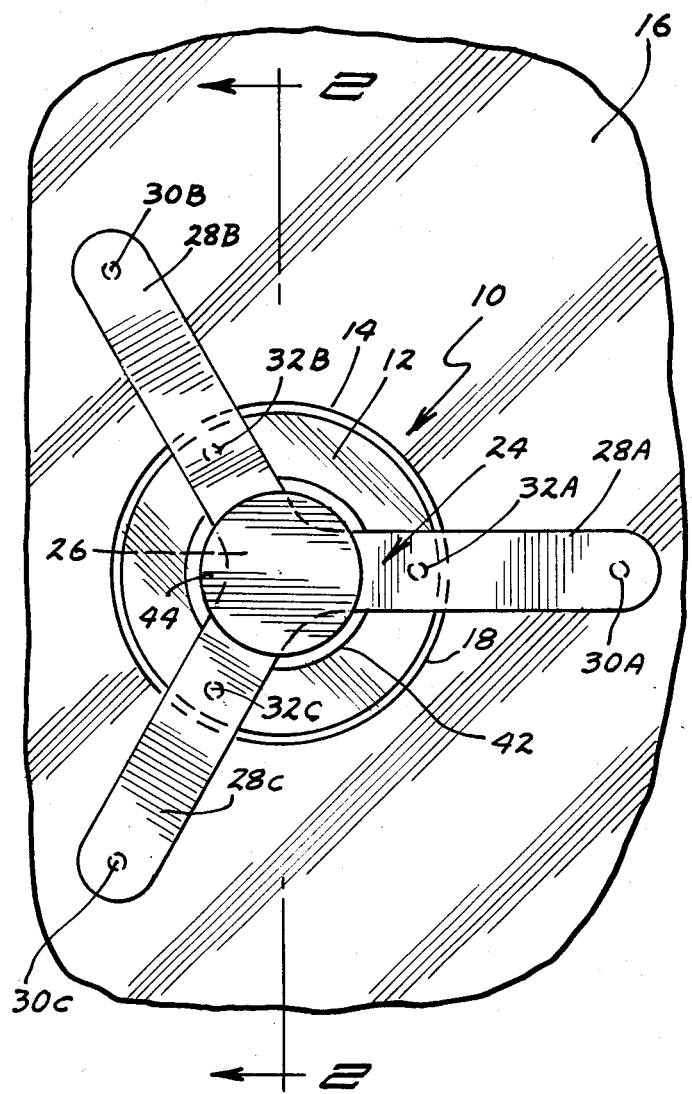
FIG. 1 is a top plan view of a device, constructed according to the present invention, for supporting a plug in an opening in a pane of glass.

A device 10 is designed to mount a glass plug 12 in an opening 14 in a pane of plate glass 16. Opening 14 is generally circular and circular glass plug 12 is of slightly smaller diameter so that a narrow circular gap 18 surrounds plug 12 when it is positioned in opening 14. Gap 18 is later filled with resin or other bonding material to hold plug 12 in position relative to pane 16. In the figures, gap 18 is exaggerated in width for clarity.

Glass plug 12 has a plane surface 20 which must be closely aligned in the plane of surface 22 of pane 16 if the repair is to be free of distortion and reflection.

Device 10 has a frame 24 which includes a central portion 26 and three radial arms 28A, 28B, and 28C. In the example illustrated, arms 28A, 28B, and 28C are generally flat and lie in a common plane. Many other possible configurations of the frame 24 are possible, as long as they provide a stable support platform.

A first set of legs, which comprises legs 30A, 30B, and 30C, is mounted peripherally on and generally perpendicular to frame 24. In this example, each leg 30A, 30B, and 30C is mounted the same radial distance from the central axis of central portion 26 and one leg is on each arm 28A, 28B, and 28C. Legs 30A, 30B, and 30C define a tripod support circumscribing a first circle or area which is larger than the periphery of glass plug 12.

A second set of legs 32A, 32B, and 32C is mounted on frame 24 (one on each arm 28A, 28B, and 28C) spaced inwardly toward the central portion 26 from the corresponding legs 30A, 30B, and 30C of the first set, so that legs 32A, 32B, and 32C define a tripod circumscribing a second circle or area which is smaller than the first circle and smaller in diameter than the glass plug 12. In the example illustrated, each leg 32A, 32B, and 32C is mounted generally medially on its corresponding arm 28A, 28B, and 28C. Legs 30A, 30B, and 30C and legs 32A, 32B, and 32C are all generally parallel and extend generally perpendicularly away from frame 24.

Figure 2:
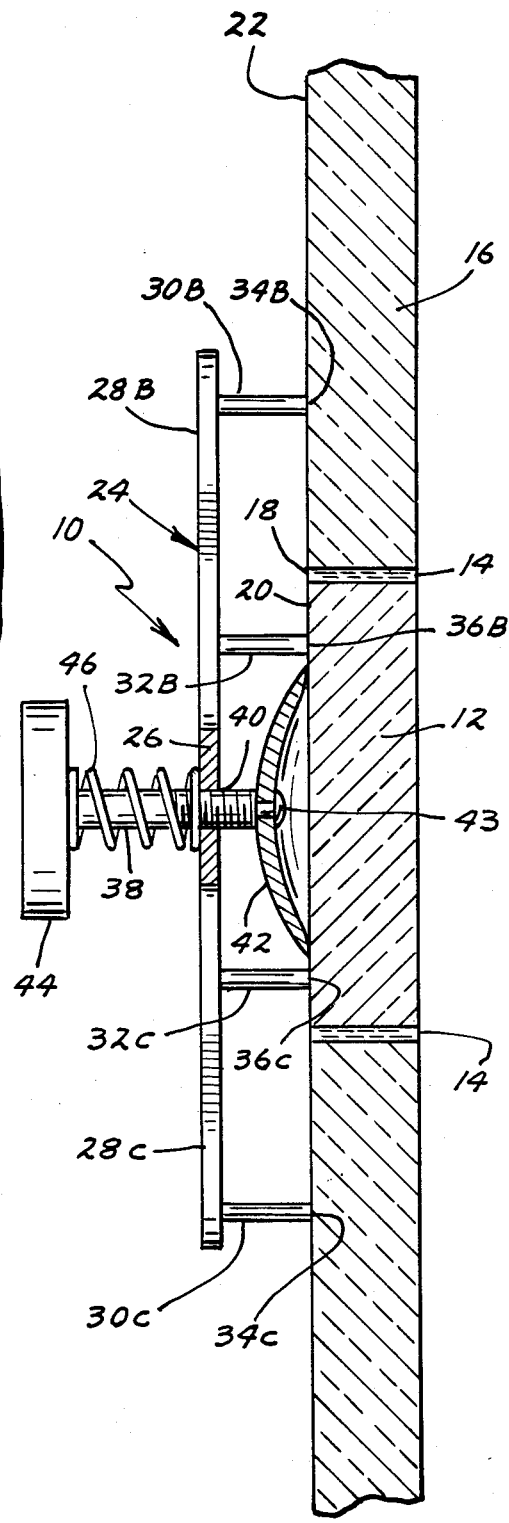
FIG. 2 is a cross sectional view taken along line 2—2 of FIG. 1.

Each leg 30A, 30B and 30C has a flat end surface 34A (not shown), 34B and 34C, respectively, at its distal end. Each leg 32A, 32B and 32C has a flat end surface 36A (not shown), 36B and 36C, respectively, at its distal end. Flat ends 34A, 34B, and 34C and 36A, 36B, and 36C are generally coplanar and all of the ends of the legs can be ground to a fine finish simultaneously or in one pass to insure that the ends of both sets of legs are coplanar. As shown in FIG. 2, when flat ends 34A, 34B, and 34C are positioned against surface 22 of pane 16, the surface 20 of plug 12 which rests against end surfaces 36A, 36B, and 36C is positioned precisely coplanar with surface 22.

Means are provided to support glass plug 12 against ends 36A, 36B, and 36C in its illustrated position. A support element 38 is slidably mounted through a bore 40 on the central axis of central portion 26 of frame 24. Support element or rod 38 slides generally perpendicular to frame 24, at least up to surface 22 of pane 16. A suction cup 42 is mounted, by bolt 43, to a first end of support element 38. Suction cup 42 is a retainer means for releasably engaging and holding surface 20 of glass plug 12.

A second end of support element 38 on an opposite side of frame 24 has a cap 44. A bias means, on this case a spring 46 mounted around support element 38, urges cap 44 away from frame 24, thereby drawing suction cup 42 towards frame 24. This urges glass plug 12 supported by suction cup 42 firmly against end surfaces 36A, 36B, and 36C.

Unlike prior art devices where pressure sensitive film or other bonding material interfered with proper alignment of a plug in a hole, the device 10, constructed according to the present invention, has a separate tripod support for the plug and for the frame on the pane. The functions of holding the plug and aligning the surfaces are separated so that the support suction cup 42 draws plug 12 into position without interfering with proper alignment contact with end surfaces 36A, 36B, and 36C. Therefore, once end surfaces 34A, 34B, and 34C and 36A, 36B, and 36C are ground to be coplanar, exact alignment is insured, without requiring special skills by the operator. The glass plug 12 need only be firmly attached to suction cup 42 so that its surface 20 is urged against end surfaces 36A, 36B, and 36C. Then the plug 12, while attached to and carried by frame 24, is positioned within opening 14 so that end surfaces 34A, 34B, and 34C of the first set of legs 30A, 30B, and 30C are positioned firmly against plane surface 22 of glass pane 16 to the outside of opening 14. Device 10 may then either be hand-held against surface 22 or attached by any commonly-used glass repair means such as suction cups holding a rubber band across frame 24.

The tripod configurations of each of the sets of legs insure that the plug will be held securely relative to the frame and will rest flat on the ends of the legs, and also insure that the frame will rest flat (without rocking) on surface 22. Thus tripod legs give reliable and stable positioning of the plug. The legs provide a small contact area to minimize any problem with grit or dirt causing uneven support.

Although the present invention has been described with reference to preferred embodiments, workers skilled in the art will recognize that changes may be made in form and detail without departing from the spirit and scope of the invention.

What is claimed is:

1. A device for supporting a plug in an opening while repairing a break in a rigid plate, comprising:
   a frame;
   a first set of legs extending away from said frame in a first direction, the legs of the first set circumscribing a first area of the frame and providing a plurality of support surfaces at spaced locations around the circumscribed first area;
   a second set of legs mounted on and extending away from the frame in generally the same direction as the first set of legs and circumscribing a second area smaller than and within the first area and providing a plurality of second support surfaces at spaced locations around the circumscribed second area;
   each leg of the first and second sets having a distal end, spaced outwardly from the frame, the first and second support surfaces being at the distal ends of the legs and the support surfaces of the legs of the first and second sets all lying on a common plane;
   support means for supporting a plug generally smaller than the area circumscribed by the first set of legs against the support surfaces of the second set of legs, the plug being for use in plugging an opening in a rigid plate; and
   said device being positionable against said rigid plate with the support surfaces of the first set of legs contacting one surface of a rigid plate to be repaired outwardly of an opening in such plate and with a supported plug within the opening so that a surface of such plug is held coplanar with said one surface of such rigid plate.

2. The apparatus of claim 1 wherein:
   the support means includes a support member slidably mounted through the frame for removable attachment to the plug; and
   the bias means includes a spring for urging the support member in a direction away from the plug to force the plug against the end surfaces of the legs of the second set.

3. The device of claim 2 wherein the support means includes suction cup means on one end of the support member for attaching the plug.

4. A device for supporting a plug for repairing a break in a rigid plate comprising:
   a frame including a central portion having a central axis and three arms extending outwardly generally radially away from the central portion;
   a first set of three legs, each leg of the first set being mounted on and extending away from one arm in a first direction;
   a second set of three legs, each leg of the second set being mounted on one arm at a lesser distance from the central axis than the respective leg of the first set, said legs of said second set extending in the same first direction from the frame generally coextensive with the legs of the first set;
   each leg of the first set and the second set having an end surface on its distal end spaced outwardly from the frame, the end surfaces being coplanar;
   a support member movably mounted on the central portion of the frame, the support member having a first end portion and a second end portion;
   retainer means mounted on the first end portion of the support member for engaging and holding one surface of a plug;
   bias means for urging the retainer means in a direction so that the surface of the plug engaged by the retainer means is urged against the end surfaces of the legs of the second set; and
   the device being positionable with the end surfaces of the legs of the first set contacting a plane surface of a rigid plate to be repaired adjacent an opening in the plate, and with a plug engaged by the retainer means within such an opening with the surface of such plug engaged by the retainer means being held coplanar with the surface of the plate to be repaired.

5. The device of claim 4 wherein said retainer means comprises a suction cup.

6. The device of claim 4 wherein said support member comprises a rod slidably mounted on the central portion on an axis generally parallel to the legs.

7. The device of claim 6 wherein the rod has a cap on its second end portion and the bias means includes a spring mounted around the rod for urging the cap away from the frame.

8. A device for supporting a plug in an opening while repairing a break in a rigid plate, comprising:
   a frame;
   a first set of three legs extending away from said frame in a first direction, the legs of the first set circumscribing a first area of the frame;
   a second set of three legs mounted on and extending away from the frame in generally the same direction as the first set of legs and circumscribing a second area smaller than and within the first area;
   each leg of the first and second sets having a distal end, spaced outwardly from the frame in the first direction, with an end surface, the end surfaces of the legs of the first and second sets being coplanar;
   support means for supporting a plug having a plug area generally smaller than the area circumscribed by the first set of legs and larger than the area circumscribed by the second set of legs, the plug being for use in plugging an opening in a rigid plate;
   means for urging a plug supported on the support means against the end surfaces of the legs of the second set; and
   said device being positionable against a rigid plate to be repaired with the end surfaces of the legs of the first set contacting one surface of such rigid plate outwardly of an opening in the plate and with a plug supported on the support means within the opening so that a surface of such supported plug is coplanar with the one surface of such rigid plate.

* * * * *